US010652505B2

(12) United States Patent
Peled

(10) Patent No.: US 10,652,505 B2
(45) Date of Patent: *May 12, 2020

(54) ON-DEMAND REAL-TIME VIDEO CONNECTION FOR PARTIES IN FIRST-IN-FIRST-OUT QUEUES

(71) Applicant: Sharon Peled, Waltham, MA (US)

(72) Inventor: Sharon Peled, Waltham, MA (US)

(73) Assignee: Sharon Peled, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/227,833

(22) Filed: Dec. 20, 2018

(65) Prior Publication Data

US 2019/0124296 A1 Apr. 25, 2019

Related U.S. Application Data

(63) Continuation of application No. 14/993,477, filed on Jan. 12, 2016, now Pat. No. 10,200,653.

(60) Provisional application No. 62/102,210, filed on Jan. 12, 2015.

(51) Int. Cl.
| | | |
|---|---|---|
| *H04L 12/18* | (2006.01) | |
| *H04N 7/15* | (2006.01) | |
| *H04L 29/06* | (2006.01) | |
| *H04M 3/56* | (2006.01) | |

(52) U.S. Cl.
CPC ........... *H04N 7/15* (2013.01); *H04L 12/1813* (2013.01); *H04L 12/1822* (2013.01); *H04L 65/1069* (2013.01); *H04L 65/403* (2013.01); *H04L 65/4015* (2013.01); *H04M 3/567* (2013.01); *H04M 2203/2072* (2013.01)

(58) Field of Classification Search
CPC ....... H04L 65/4015; H04L 67/38; G09B 5/06; G09B 5/08; G09B 5/10; G09B 5/12; G09B 5/125; G09B 5/14
See application file for complete search history.

(56) References Cited

U.S. PATENT DOCUMENTS

| | | | |
|---|---|---|---|
| 8,435,038 B2 | 5/2013 | Wilson et al. | |
| 8,949,269 B1* | 2/2015 | Wolff | G06F 7/00 707/770 |
| 2001/0049087 A1* | 12/2001 | Hale | G09B 7/02 434/350 |
| 2003/0177187 A1* | 9/2003 | Levine | A63F 13/10 709/205 |
| 2005/0227216 A1* | 10/2005 | Gupta | G06Q 50/205 434/322 |
| 2007/0233291 A1* | 10/2007 | Herde | G06Q 10/02 700/91 |
| 2007/0282959 A1* | 12/2007 | Stern | G06Q 30/02 709/206 |
| 2008/0014569 A1* | 1/2008 | Holiday | G09B 3/00 434/351 |

(Continued)

*Primary Examiner* — Aftab N. Khan
(74) *Attorney, Agent, or Firm* — Intrinsic Law Corp.

(57) ABSTRACT

A system and method is described for facilitating a video connection between service providers and service consumers (clients) based on a queue of providers waiting in video rooms. Upon entry into a video room using a networked camera and microphone, each service provider receives a timestamp. Clients requiring service connect to the available provider with the oldest timestamp. In certain embodiments, the queue holds math tutors and the cameras are document cameras.

6 Claims, 6 Drawing Sheets

(56) References Cited

U.S. PATENT DOCUMENTS

| | | | | |
|---|---|---|---|---|
| 2009/0164615 A1* | 6/2009 | Akkanen | ............... | H04L 67/104 709/223 |
| 2015/0339676 A1* | 11/2015 | Tuchman | .............. | H04L 63/104 705/304 |
| 2016/0142471 A1* | 5/2016 | Tse | ........................ | G06F 3/0488 715/753 |

* cited by examiner

ON-DEMAND REAL-TIME VIDEO CONNECTION FOR PARTIES IN FIRST-IN-FIRST-OUT QUEUES

RELATED APPLICATIONS

This application is a continuation of application Ser. No. 14/993,477, filed on Jan. 12, 2016, and claims the benefit of Provisional Appl. Ser. No. 62/102,210, filed on Jan. 12, 2015, each of which is hereby incorporated by reference.

TECHNICAL FIELD

The present disclosure is directed to the provision of services that utilize real-time video communication over a network. More particularly, the disclosure is directed to a network-based architecture and method connecting a provider with a client in an organized queue among other aspects.

BACKGROUND

Network-based one-on-one provision of service has become widespread with the ever-growing availability of the Internet and mobile telecommunications access around the world. In-person service, in comparison, is expensive, often inconvenient in terms of travel for either service providers or clients, and sometimes simply unavailable.

For some fields of remote service, for example online teaching of mathematics, or provision of advice in cooking or medicine, to name a few quite disparate disciplines, a real-time video connection is extremely helpful. In mathematics instruction both students and tutors often need to be able to show the method of problem solving, which can include at least diagrams, graphs, geometric shapes, and equations.

Video conferencing technology debuted in the United States during the 1960s, e.g., as part of AT&T's development of Picturephone technology. The first transcontinental video call was made in 1964. Video conferencing systems throughout the 1990s rapidly evolved from very expensive proprietary equipment, software and network requirements, to a standards-based technology readily available to the general public at a reasonable cost.

Since the 2000s, video conferencing has been popularized via free Internet services such as Skype and iChat, web plugins and on-line telecommunication programs that promote low cost video conferencing to virtually every location with an Internet connection. Computers serve as the data processing units that tie together the microphones, speakers, cameras and displays, do the compressing and decompressing, and initiate and maintain the data linkage via the network.

Bruno (U.S. Pat. No. 5,784,561 granted 1998) describes an on-demand real-time video conferencing system in a circuit switched communications network. The technology enables a user to connect to another specified user or to multiple specified users.

Chao et al (U.S. Pat. No. 6,325,632 granted 2001) describes an apparatus enabling online sessions between instructors and students whereby students and instructors are matched based on individual needs and interests.

Stuppy et al (U.S. Pat. No. 6,733,295 granted 2004) describes a learning system between a teacher and a plurality of students via interactive communication channels.

In some cases, service is wanted immediately in order to address a specific, time-sensitive need, such as homework or test revision. In this case the availability of an on-demand immediate response from a provider would be advantageous.

Burdin (US Patent Application Publication 2011/0289880) describes a method for on-demand dispatching of services by trade persons, in which local contractors indicate real-time availability for immediate hiring by customers. The contractors indicating availability are placed in a queue where their position in the queue is determined by payment of a fee, and the services, if ordered, are then provided off-line.

Schoenberg (U.S. Pat. No. 8,694,612 granted 2014) discloses a method for connecting consumers with providers of live video performances, whereby the selection of service provider is determined by the consumer's request for specific performance attributes.

Tutor.com is an online site providing 24/7 tutoring in many subjects, including mathematics. Users log in and can pay to choose from a wide variety of tutors in different subjects, where tutors are identified by a picture, name, and written profile. After making an appointment, communication during tutoring sessions is via voice, text chat, and shared interactive electronic whiteboard.

TutorCircle is another online site providing mathematics tutoring around the clock. After purchasing a monthly plan, users can connect to a tutor using voice, text chat and a shared electronic interactive whiteboard.

WebRTC (Web Real-Time Communication) technology makes high-resolution video, audio, file sharing and screen sharing possible directly in many web browsers without requiring software download. WebRTC is an application programming interface (API) definition drafted by the World Wide Web Consortium (W3C) that supports browser-to-browser applications for voice calling, video chat, and P2P file sharing without the need of either internal or external plugins. Joining a one-way or two-way videoconference (also referred to as entering a video "room") is as simple as clicking on a link.

Despite the technologies known in the art, there remains a need to streamline access to on-demand remotely provided services that rely heavily on visual representations and acts via videoconferencing. This disclosure addresses a system and method for doing so. More particularly, the present disclosure is directed to methods and systems that specifically address the practical needs for real-time instructional interaction in a cost-effective, secure and reliable fashion.

SUMMARY

To address the need for immediate video communication in particular network-based provisions of service, the present disclosure is directed to a system and a method for a customer, user or client hereinafter referred to as a "Client", to receive real-time video services via a communication network, from a service provider, instructor or performer hereinafter referred to as a "Provider".

In the following, the term "videoconference" between a Client and a Provider will be used to refer to a connection that encompasses at least real-time video and audio originating from the Provider and transmitted in real time to the Client, and at least audio originating from the Client and transmitted in real-time to the Provider.

In an aspect of the current disclosure, a first-in-first-out (FIFO) Queue of service providers is described and implemented, where each Provider enters a unique video room using a camera and microphone connected physically or wirelessly to a computer, tablet, or smartphone, or a camera and microphone incorporated within a computer, tablet or smartphone. Each Provider's position in the queue is determined by the time of entry to said video room. Clients requiring service join the video room of the provider that has been waiting for the longest time. A Client can join the video room only with a microphone, or with both a camera and a microphone. This provides a seamless, immediate, videoconferencing connection.

In certain embodiments, exceptions to the FIFO ordering of the provider queue can occur. For example, this can occur when a Provider specifies availability only for a particular Client after scheduling with said Client, or when Clients have indicated preferences for particular Providers.

The present disclosure comprehends an environment having a plurality of Clients and a plurality of Providers. However, in an aspect, each service session is between one Client and one Provider. Clients may be billed for the service and Providers may be compensated for the service. In some aspects, no personal information or personal images need to be exchanged. The present system and method may be generalized to examples where one Provider (e.g., an instructor or a performer) is presenting to and connected to multiple students or an audience of many distributed Clients as would be appreciated by those skilled in the art.

In an embodiment, the video technology utilized to connect the Clients and Providers is WebRTC running in a browser, but other means of providing videoconferencing services may be utilized.

BRIEF DESCRIPTION OF THE DRAWINGS

For a fuller understanding of the nature and advantages of the present concepts, reference is made to the following detailed description of preferred embodiments and in connection with the accompanying drawings, in which.

DETAILED DESCRIPTION

Figure 1:
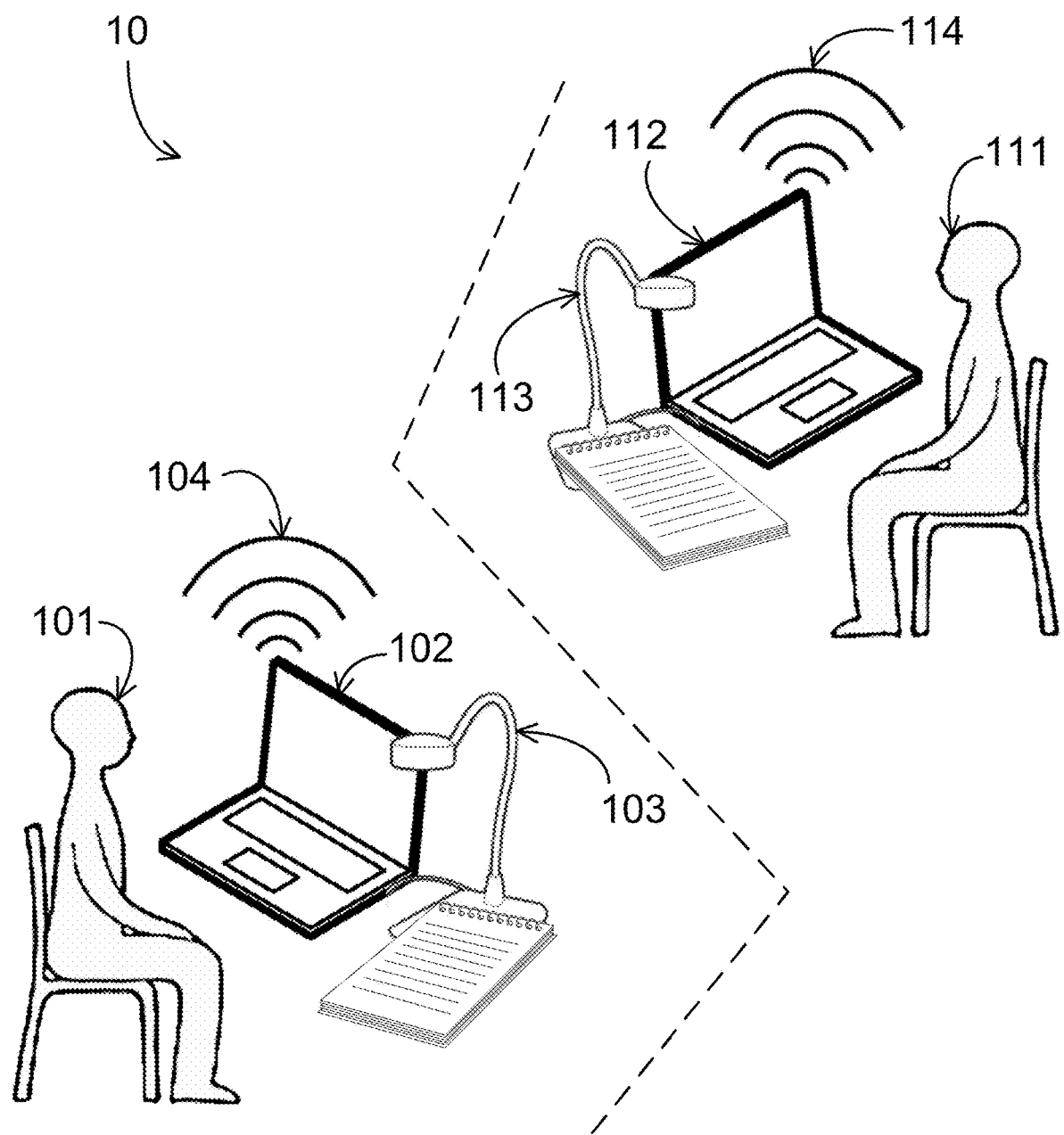
FIG. 1 illustrates an embodiment of a mode of communication between a Client and a Provider using document cameras attached to laptops.

Aspects of this disclosure are directed to a system and method of connecting Clients and service Providers over a network such that graphical or visual information is rendered on demand in real time via video. Other data, text, audio, speech and multimedia content may also be exchanged or shared between the Client and the Provider in some aspects.

Examples of use of the present techniques include instructional (e.g., tutoring) or demonstration usage whereby several registered Providers (e.g., tutors) are called on to serve the needs of respective registered Clients (e.g., pupils) using the present system and method.

According to an embodiment, Providers log into a website or application on a networked device, and indicate their availability for giving service by starting a video session using a camera and microphone connected to their networked device or directly incorporated in it. The starting of said video session places said Provider in a Queue that operates in a first-in-first-out (FIFO) manner. Each Provider entering said Queue receives an entry timestamp.

When a Client logs on and requests service from the Queue, e.g. by clicking a button, said Client will generally be connected to a video room of the Provider with the oldest timestamp (see exceptions below).

Client and Provider then engage in an online session during which Provider provides service. The service may be instructional services (tutoring, teaching) or other assistive services as would be appreciated by one of skill in the art. The service session will be considered over once either of the parties exits the video room. Session audio and even complete video may be recorded or archived, e.g., for quality control, verification, training, or other auditing purposes. Time spent by Clients and Providers in session may be recorded and Providers may be compensated and Clients may be billed according to the services rendered, e.g., type or duration of the services.

After a service session is completed, the Provider can exit the Queue. If the Provider wishes to continue providing services in the Queue, he/she receives a current timestamp (thus is effectively placed in the last position in the Queue). This may or may not require entry of the Provider into a new video room.

In some aspects, Client has the option to designate any Provider as having a special "preferred" status. This status can be conferred on a Provider by a Client if the Client rates the Provider highly. A Client may designate multiple Providers as "preferred" Providers. Providers may be designated "preferred" by multiple Clients.

Likewise, Client has the option to designate any Provider as having a special "undesired" status. This status can be conferred on a Provider by a Client if said Client is not satisfied with the service rendered by said Provider. A Client may designate multiple Providers as "undesired" Providers. Providers may be designated "undesired" by multiple Clients. An "undesired" Provider (or conversely Client) may be blocked by the respective Clients (or Providers) and prevented from contacting the counterpart who designated them as "undesired". A log of such designations may also be reported, stored or logged in a database or communicated to an administrator of the system.

In an aspect, when a Client requests service, said Client may be connected to a "preferred" Provider, if such a Provider is anywhere in the Queue at the time of said Client's request. If multiple "preferred" Providers are in the Queue, the Client may be connected to the "preferred" Provider with the oldest timestamp. If no Provider designated by the Client as "preferred" is available at that time, or Client has not designated any Providers as "preferred, Client will be connected to the Provider with the oldest timestamp. In some embodiments, a Client may never be connected to a Provider designated as "undesired" by said Client, effectively blocking the "undesired" Provider from the designating Client.

If, during a service session, Provider and Client mutually agree to schedule one or more future online sessions with each other, in another aspect, Provider and Client can enter into a "favorite" status relationship. A "favorite" status relationship between a Client and a Provider confers on the Client and the Provider the ability to coordinate dates and times for future sessions between them. According to some embodiments, a Client can designate only one Provider at any time as having "favorite" status. However, a Provider can be designated a "favorite" Provider by multiple Clients.

In yet another aspect, a Client in a "favorite" relationship with a Provider can request particular dates and times for a session with said Provider. A Provider in a "favorite" relationship with one or more Clients can see the requests of all said Clients and accept them individually, whereupon the time becomes "reserved" for that particular requesting Client. Said Provider can also post date/times when he/she is "Open" i.e. available for providing service, such that said Clients can see those times and reserve them.

At a mutually appointed time for a session between a Provider and a Client in a "favorite" relationship, said Provider enters a video room and indicates availability for said particular Client and only said Client can physically connect at that time to said Provider.

Those skilled in the art will appreciate that the foregoing features and examples are illustrative of useful ways in which the present system and method can be implemented, but that other implementations including other features can be implemented as well. Similarly, those skilled in the art will understand that the above examples and aspects are not all required for operation of the present system and method. Such features and embodiments may be included as needed for a given application.

FIG. 1 illustrates one embodiment of video-based communication 10 where a Provider 101 is equipped with a computer 102 to which a document camera 103 is attached. The computer 102 in this case is connected to a network 104. Client is also provided with a network-connected communication device and document camera which allows Client to communicate over said network with Provider. The communication between Client and Provider is preferably real-time or near real-time (meaning with minimal propagation delay or latency) and may be over a wired, wireless or hybrid wired and wireless communication network such as the Internet. In a preferred embodiment, the document cameras provide both video and audio communication between the parties. However, those skilled in the art would appreciate that the video feeds may be provided by a video camera while the audio feeds may be provided by a separate audio microphone-speaker arrangement as available on the respective devices of the parties.

Figure 2:
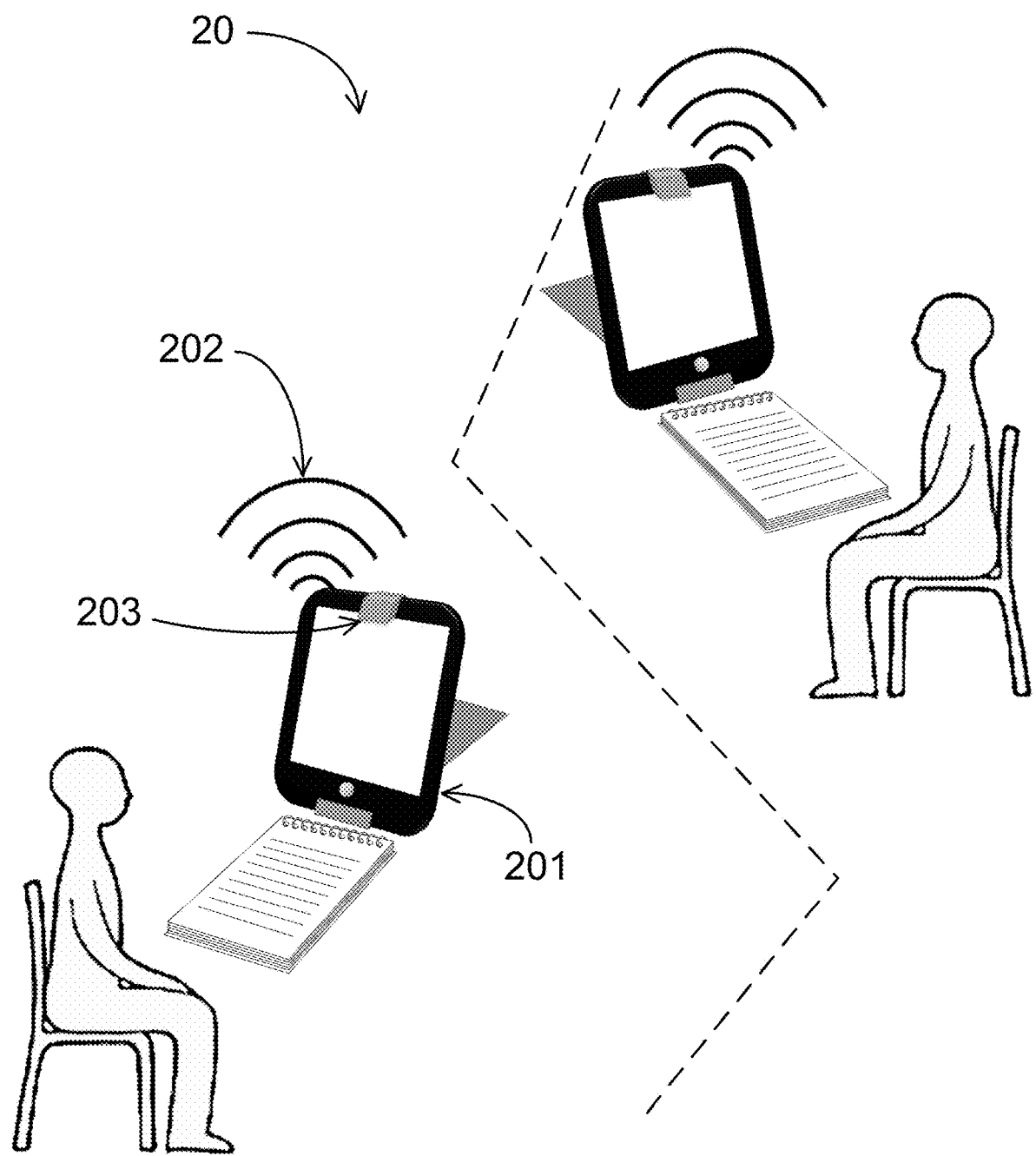
FIG. 2 illustrates a communication embodiment using tablet computers outfitted with an optical mirror or prism positioned on a built-in tablet camera to show objects placed in front of the tablet.

FIG. 2 illustrates an alternate embodiment of video communication 20 where a Provider is using a networked tablet computer 201 on which is mounted a reflective optical mirror or prism 203. The reflective mirror or prism 203 is placed such as to allow a camera embedded in the tablet 201 to capture video of any objects placed in front of the tablet 201. Such a reflective camera is available for example from Osmo and described at https://www.playosmo.com. The network connection between tablet computer 201 and the communication network may be a wireless connection 202, e.g., 802.11 or a cellular connection, e.g., 3G, 4G, LTE or other wireless data connection.

In addition to real time audio and video, communication during a service session may include text chat, interactive shared electronic whiteboard, and any other mode of communication that enables the service that benefits the communicating parties.

In another aspect, more than two persons/devices may be involved in a single communication session. For example, a tutor may provide tutoring to two or more students in a single live session. The two students may be co-located or not.

An exemplary and non-limiting embodiment is described herein whereby tutors of mathematics provide assistance to high school students in connection with the latters' scholastic studies, homework, exam preparation and so forth. In this embodiment, communication is established over a network using an appropriate protocol, e.g., via WebRTC browser-based technology, and both students and tutors communicate using document cameras as described above. Said cameras can convey real time video of horizontally placed documents from each party's desk, such that written or drawn work is transmitted in real time while in the act of being written or drawn, as illustrated in FIG. 1. Textbooks, pages thereof, and other printed documents can also be relayed. Also, as mentioned earlier, audio conversations can accompany the video transmission so that the students and tutors may speak to one another during a tutoring session in addition to the exchanged video imagery of their live video stream. The audio stream can be synchronized with the video stream and implemented as a separate link or as part of an audio-visual communication link as best suits a given architecture.

Other embodiments of the hardware enabling a tutor-student connection include a camera embedded in a tablet, such as shown in FIG. 2, or a camera held above a board and attached to said board (not illustrated). Said board could also be a dry-erase board. Other embodiments may utilize cameras embedded in other locations on tablets, as well as cameras in smartphones. Any combination of a display and camera could potentially provide the requisite hardware. Again, audio information can be included with or separately synchronized to the video data between the communicating parties as necessary.

Figure 3:
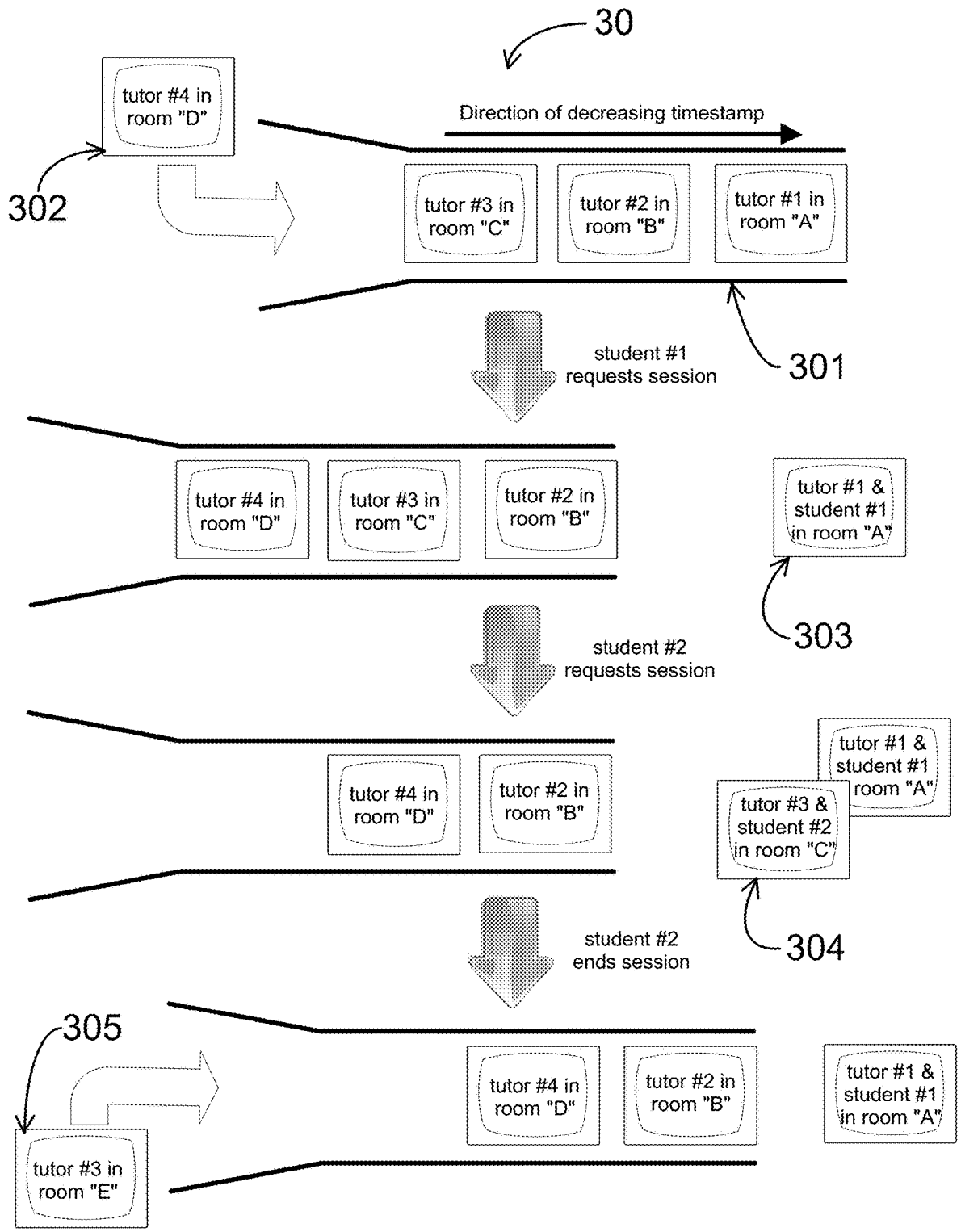
FIG. 3 illustrates a flowchart of Providers (tutors) and Clients (students) connecting with each other according to a modified FIFO Queue.

FIG. 3 shows a flow chart illustrating the initiation of video sessions according to an embodiment 30. Mathematics tutors indicate their availability by logging on to a website and pressing a button to enter a unique video room. This act serves to place them in a FIFO queue 301 ordered by the timestamp of entrance to the video room, as in the case of "tutor #4" entering video room "D" (302). In this example the first tutor in the queue, "tutor #1" in room "A" has the oldest timestamp. The next oldest timestamp belongs to "tutor #2" in room "B", followed by "tutor #3" in room "C". For illustration purposes, it is assumed that "tutor #3" has been chosen as a "preferred tutor" by "student #2".

Logged in students that attempt to receive the real-time video-based service in this embodiment will be directed to the video room of the tutor with the oldest timestamp. In this case "student #1" will join "tutor #1" in room "A" (303).

When a second student, "student #2", requests a session, he/she will join "tutor #3" in room "C" (304) because of the preferred status of "tutor #3".

After "student #2" ends the video session, "tutor #3" may enter a new video room, room "E" (305) and receive a new timestamp in the queue.

The queue may be implemented by way of a table in a database having rows including the tutors' identifying username, the unique video room name, the timestamp of entry into the room, and the identifying username of a student when in session with a tutor.

Files can be uploaded by a student to the web server and will be visible to any tutor during a session with said student. Screen sharing could also be implemented using WebRTC or a similar protocol. While the present examples are well suited for mathematics instruction, those skilled in the art will appreciate that the present methods and systems are also suitable for other instructional, assistive or entertainment applications.

Figure 4:
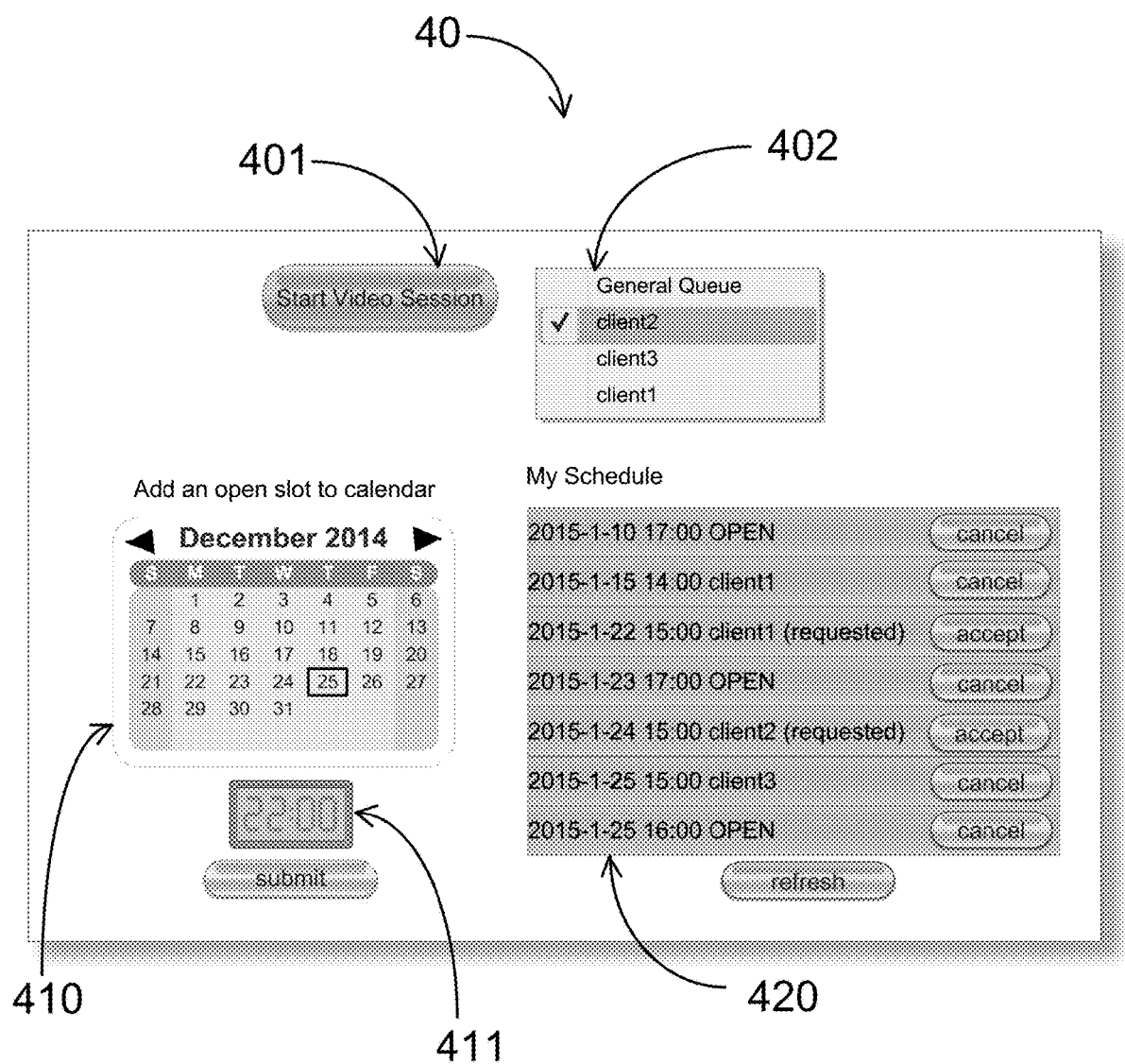
FIG. 4 illustrates a Provider (tutor) page showing a video session initiation button, with a choice between entering the Queue or indicating availability for a particular "favorite" Client, the ability to post "open" times on the Provider's calendar, and the ability to accept Clients' requested times.

Referring to FIG. 4, a tutor in a "favorite" relationship with one or more students may see a graphic interface 40 of an application running on the tutor's communication device (e.g., computer, tablet, mobile device). Said tutor may use button 401 to enter a video room, while designating either entrance to the General Queue, or limiting access to a particular "favorite" student by choosing said student's login from a pull-down menu 402. In table 420, the tutor can see his/her own schedule as well as the time requests of all "favorite" students and accept them individually, whereupon the time becomes "reserved" for that particular requesting student. A tutor can also post date/times when he/she is "Open" i.e. available for providing service, using date and time input tools (410,411) such that "favorite" students can see those times and reserve them. These time slots may also be displayed on a calendar.

Figure 5:
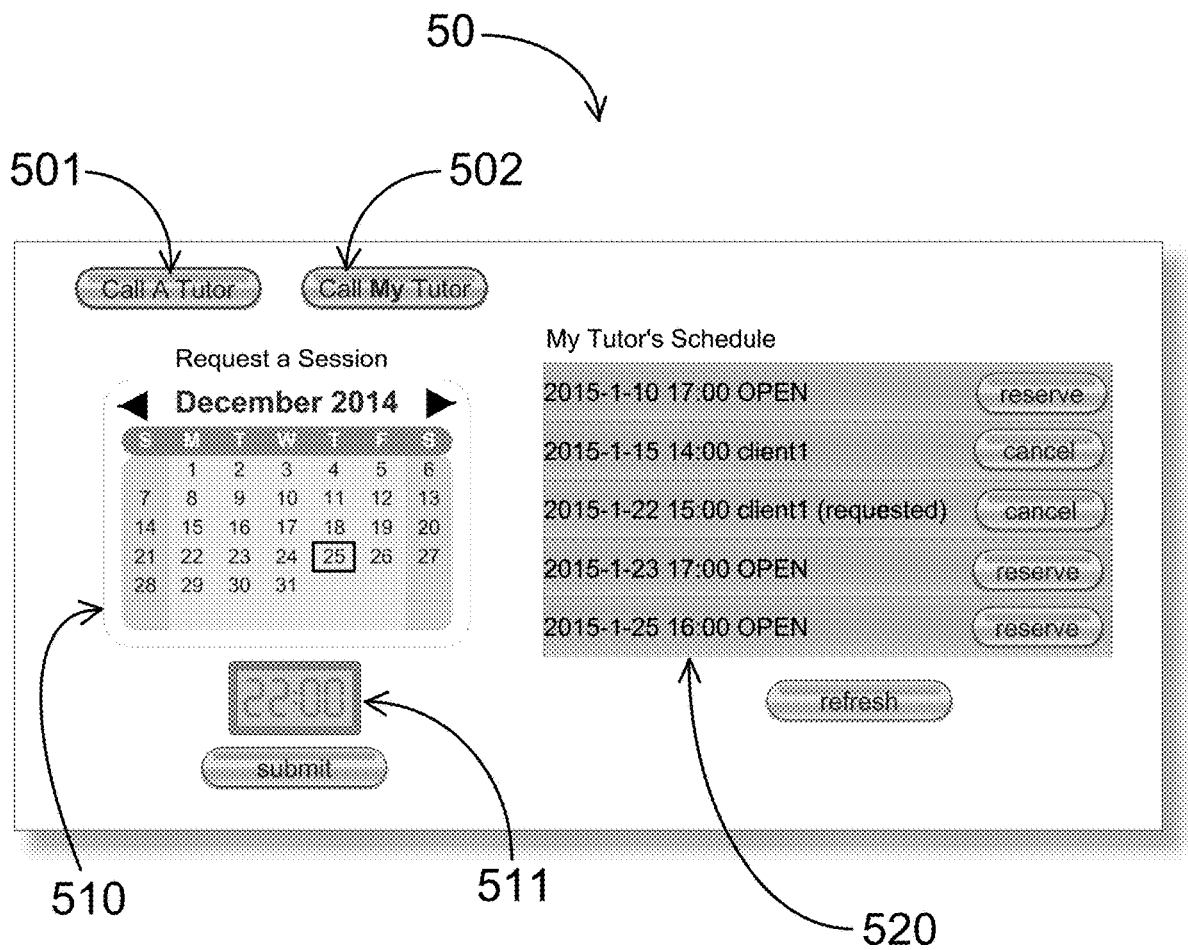
FIG. 5 illustrates a Client (student) page showing: video initiation buttons, appointment request interface, and view of "favorite" Provider's schedule.

FIG. 5 illustrates an illustrative screen shot of an application showing an example of what the student interface would display (50) to a student in a "favorite" relationship with a tutor. Two buttons are provided for entering a video room—one to start a session according to the aforementioned rules of the queue (501) and one to enter the video room of the "favorite" tutor when a session has been scheduled (502). Said student can request particular dates and times for a future session with the "favorite" tutor using date and time input tools (510, 511). The relevant part of the "favorite" tutor's schedule is displayed (520) and "Open" sessions can be reserved.

Accordingly, in an embodiment, the present system provides a network-based interface for communication between Providers (e.g., of entertainment, instructional or other services) and Clients who request said services. The Providers and Clients may be provided with an installable software application that exploits hardware on Provider terminal devices and Client terminal devices, respectively to communicate with a server owned or managed by a service, e.g., over the Internet. The Clients and Providers may enter the service through a same or through separate interfaces, which can have Web-based front ends or employ a specially-made software user interface.

Registered Clients and Providers are associated with respective identification information, which can include a real name, a user name different from the real name, an address, ID number or similar unique identifying information. Authentication of registered users (Clients, Providers) can be accomplished using an authentication engine or module that can employ user name and password or other authentication information recorded in a data store, e.g., in a memory unit coupled to a server.

Once authenticated as a registered user (either Client or Provider) registered Clients are directed to a Client queue, which can be a first-in-first-out (FIFO) queue. Registered Providers are directed to a FIFO Provider queue. When a Provider waiting to provide services has been in the Provider queue longer than other Providers, he or she will take up the next incoming Client request for services. Similarly, Clients who have been waiting in the Client queue longer than other Clients would be allocated to the next available Provider. In one aspect this addresses the situation where the number of Providers and Clients connected to the system are not the same.

A connected and authenticated but yet unpaired Provider is placed into a video room environment (e.g., using WebRTC or another protocol), into which a connected and authenticated Client is placed. The Client and the Provider, having been paired into the video room, can now interact and conduct the instructional session. A session may entail a one-on-one connection between the terminal devices of the Client and the Provider, directly, i.e. in a peer-to-peer configuration. Or, the session may be brokered by the server or a dedicated video conferencing server in a centralized configuration. The placement of the Provider and the Client into the video room can take place prior to pairing, or alternatively, at the time of pairing.

In general, one Provider is assigned to one Client, forming a one-to-one pair between a paired Provider and a paired Client. The system may pair Clients and Providers based on a pairing criterion that can include a length of time in queue, a membership or payment level (e.g., premium members are processed more quickly than others) or on the basis of a "favorite" identification. As mentioned, a Client may indicate a Provider as a "favorite" (or conversely, a less "favorite") and that is recorded in the data store so that this Client and this Provider can be favorably paired in future sessions (or not paired if they indicate they do not wish to work together again).

Client accounting information can be recorded in the server's data store. This accounting information may indicate a payment method, cost basis, minutes remaining in a Client's balance or other information indicative of how much a Client can spend on services or has spent on services to be billed by the system. In an aspect, the valuation of the services is time-dependent and can depend on the time of day (e.g., prime homework time could be more or less costly), the day of the year (e.g., the days around final exams could be more or less costly), or the number of Clients or Providers present in their respective queues (e.g., based on a supply and demand of Providers and Clients at a given time). An indication of the valuation of the services can be displayed to the Clients and Providers through their respective interfaces on the service's Web site or on the terminal devices through an app running thereon.

Figure 6:
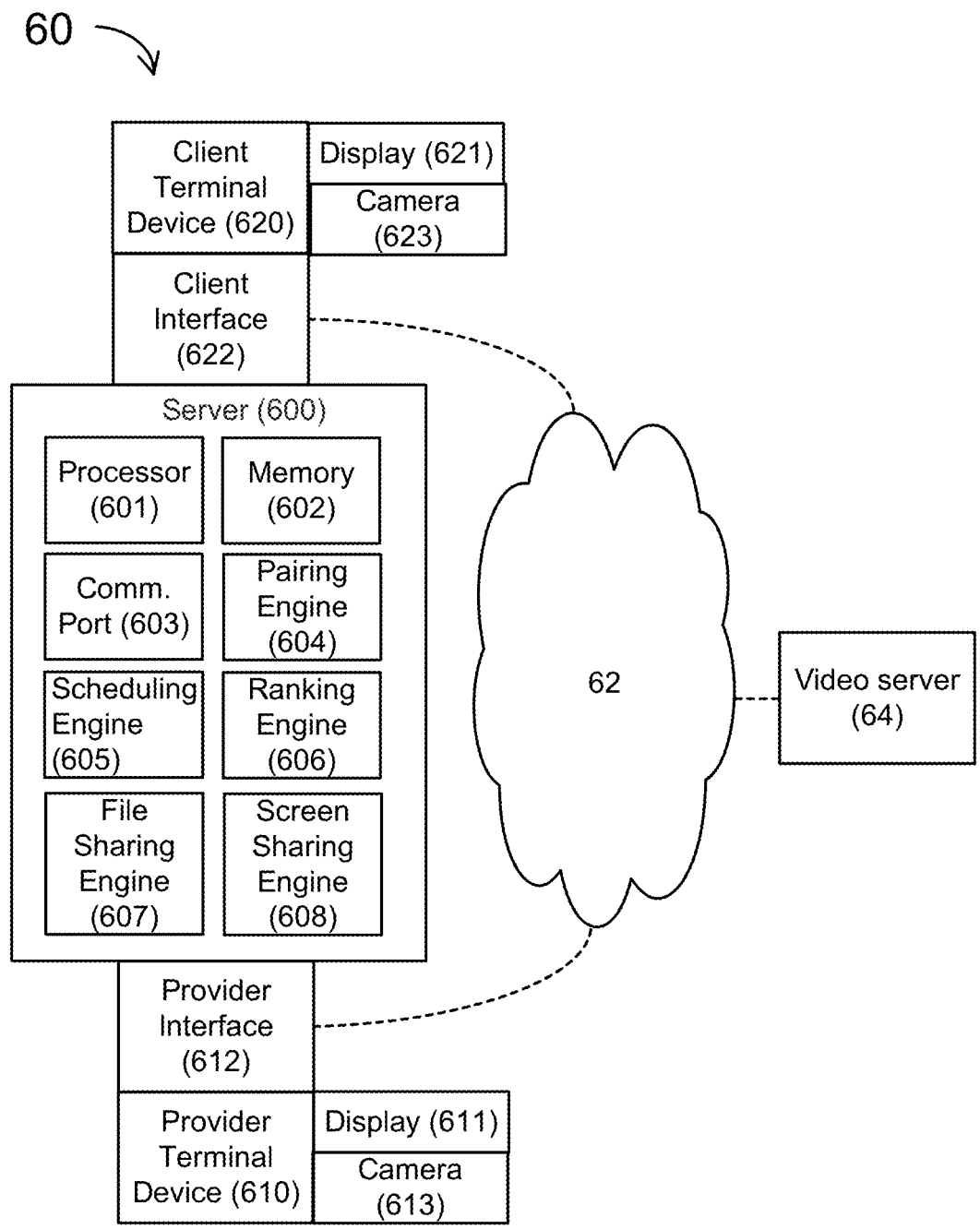
FIG. 6 illustrates an exemplary architecture of a server-based system for providing instructional services between a Provider and a Client.

FIG. 6 illustrates an exemplary architecture of a system 60 on which the present methods can be applied. Those skilled in the art will appreciate that this representation is for illustrative purposes and that other equivalent implementations with other optional features and components are possible and comprehended by this disclosure.

A Provider terminal device 610 is operated or owned by a service Provider who interacts with system 60 through a Provider interface 612. A Client terminal device 620 similarly interacts with the system 60 through Client interface 622. The Client and Provider terminal devices 620, 610 may be equipped with respective display screens 621, 611 and video cameras 623, 613. The displays and the cameras may be on a same face or side of the terminal devices so that a user can both send and view imagery of themselves or a document they are working on during a session. The cameras 623, 613 may be downward-facing with respect to the environment of the users so as to focus and direct the field of view of the cameras towards a document, page of a text book, note book or similar writing surface. The cameras may also be configured to exclusively project images of said documents so as to obscure and not include images of their respective users, e.g., for privacy purposes, especially when used by minors.

Server 600 may include in addition to a processor 601 and memory unit 602 a communications port 603 for exchanging data with other computers or over network 62. Server 600 may also be provided with a pairing engine 604 to pair Clients and Providers, e.g., using a pairing criterion as discussed herein. Also, a scheduling engine 605 is provided for generating scheduling messages alerting certain Providers and Clients of an upcoming future time for scheduled instructional services between them. A calendar app or extension may allow a Client to request a certain time for his/her next session with a Provider. The Provider can accept the requested schedule time and a confirmation message is sent through the Client and Provider interfaces 622, 612. In addition, file sharing and screen sharing engines 607, 608 may be included in server 600 for allowing paired Clients and Providers to exchange information in electronic files or as video image streams.

Each of the Client and Provider terminal devices can communicate with the system 60 directly or indirectly, depending on the given implementation desired. In some aspects, video streams between the Client and the Provider are exchanged directly. In other aspects, a video server 64 may broker the exchange of video and/or audio data between the Client and the Provider, e.g., over a network 62.

In an embodiment, an alert is sent to a Provider terminal device informing the Provider that one of his/her pupils (Clients) is connected and requesting instructional services. This can be achieved using stored favorites or ranking data in the memory of server 600 if a Provider is identified as a preferred or favorite of a connected Client. Also, registered Providers may receive messages alerting them of the need for their services, e.g., that a large number of Clients await service, optionally informing the Providers of favorable service rates at times of high demand.

This embodiment preserves privacy and confidentiality in that no identifying information about the tutor needs to be provided to the student, only students' usernames are known by the tutor, and faces are not displayed due to the use of document cameras.

The present invention should not be considered limited to the particular embodiments described above, but rather should be understood to cover all aspects of the invention as fairly set out herein. Various modifications, equivalent processes, as well as numerous structures to which the present invention may be applicable, will be readily apparent to those skilled in the art to which the present invention is directed upon review of the present disclosure.

I claim:

1. A method for conveying instructional services between remotely-located Providers and Clients over a communication network using a video connection between a Provider and a Client, the method comprising:

registering a plurality of registered Clients in a Client registry in a first data store coupled to a server, said registration of said Clients including registration of Client identification information and Client accounting information;

registering a plurality of registered Providers in a Provider registry in a second data store coupled to said server, said registration of said Providers including registration of Provider identification information;

providing a Client interface on said server adapted and arranged to permit two-way video communication between said server and respective Client terminal devices of registered Clients connecting to said server;

authenticating a registered Client on said server using an authenticator based on information stored in said Client registry;

providing a Provider interface on said server adapted and arranged to permit two-way video communication between said server and respective Provider terminal devices of registered Providers connecting to said server;

authenticating a registered Provider on said server using said authenticator based on information stored in said Provider registry;

placing authenticated Clients into a Client first-in-first-out (FIFO) queue;

placing authenticated Providers into a Provider first-in-first-out (FIFO) queue; and establishing a real-time video connection between a Client that has been in said FIFO Client queue longer than any other Client and a Provider who has been in said FIFO Provider queue longer than any other Provider.

2. The method of claim 1, further comprising sharing an interactive electronic whiteboard between said Client that has been in said FIFO Client queue longer than any other Client and said Provider that has been in said FIFO Provider queue longer than any other Provider.

3. The method of claim 1, further comprising tallying a quantity of services rendered by Provider to Client and recording an accounting result in said Client accounting information of said data store.

4. The method of claim 1, further comprising presenting a real-time indication of a duration of services between the Client and the Provider who are in said real-time video connection.

5. The method of claim 1, further comprising taking a given Client's review regarding quality of service by a Provider and recording said review in said data store so as to identify a given Provider that the given Client prefers or does not prefer for future services based on said given Client's review.

6. The method of claim 5, further comprising scheduling a future video session between said given Client and said given Provider in a scheduling engine in said server, and sending notice messages to each of said given Client and given Provider indicative of a time of said future video session.

* * * * *